(12) United States Patent
Baird

(10) Patent No.: US 7,437,812 B2
(45) Date of Patent: Oct. 21, 2008

(54) METHOD FOR MOUNTING AN AUTOMOBILE RIM ON A MOTORCYCLE

(76) Inventor: Rodney Baird, 1714 183rd St., Homewood, IL (US) 60430

( * ) Notice: Subject to any disclaimer, the term of this patent is extended or adjusted under 35 U.S.C. 154(b) by 101 days.

(21) Appl. No.: 11/524,814

(22) Filed: Sep. 21, 2006

(65) Prior Publication Data

US 2008/0073969 A1 Mar. 27, 2008

(51) Int. Cl.
  *B23P 17/04* (2006.01)
  *B60B 25/00* (2006.01)
  *B21D 53/88* (2006.01)

(52) U.S. Cl. ............... 29/401.1; 29/894.3; 29/897.2; 29/898.07; 29/525.11; 301/110.5; 301/6.1; 180/218

(58) Field of Classification Search ............... 29/894.3, 29/894.321, 894.322, 897.2, 898.07, 401.1, 29/525.01, 525.11, 892.1, 893.2; 301/110.5, 301/6.1, 6.8, 6.9; 280/205, 415.1, 63; 180/218, 180/219, 224

See application file for complete search history.

(56) References Cited

U.S. PATENT DOCUMENTS

| 2002/0185321 A1* | 12/2002 | Lin | 180/219 |
| 2006/0284472 A1* | 12/2006 | Chen | 301/6.9 |
| 2007/0132306 A1* | 6/2007 | Chang | 301/110.5 |

OTHER PUBLICATIONS

AA/AA-700SA.JPG (3-Pages) Red-Bike2.JPG Heathen-LRG3. Stevechop3.JAG Custom #1 Joels-Shovel Rear-Black-Viper Gallery-AF-8.

* cited by examiner

*Primary Examiner*—Jermie E Cozart
(74) *Attorney, Agent, or Firm*—Clifford Kraft

(57) ABSTRACT

A method and assembly for mounting an auto rim and either motorcycle or auto tire as a motorcycle rear wheel. The assembly allows tires of different widths and diameters to be used on the rear of motorcycles that have single side swing arms and standard swing arms. The method and assembly allows a left side or right side drive which can be a belt or chain. A hub with bearings and spacers are mounted with a brake rotor disk and a drive pulley in tandem to produce a hub assembly.

13 Claims, 5 Drawing Sheets

METHOD FOR MOUNTING AN AUTOMOBILE RIM ON A MOTORCYCLE

BACKGROUND

1. Field of the Invention

The present invention relates generally to the field of motorcycles and more particularly to a method and assembly for mounting an automobile rim with a motorcycle or auto tire on a motorcycle.

2. Description of the Prior Art

It is known in the art of motorcycles to mount various rims and tires on motorcycles. Several attempts to mount auto rims and tires have been reported. Car tires and motorcycle tires have been mounted on car rims which were then mounted on motorcycles. However, it is particularly difficult to mount a wide car tire on the rear of a motorcycle and still retain a disk brake and a drive chain or belt. It is particularly difficult to mount such a tire on the rear of a motorcycle where the result can be a left side drive or can be flipped to create a right side drive as well as use different sized tires and a standard swing arm and a single side swing arm.

It would be advantageous to have a method of mounting automobile rims with a motorcycle or auto tires of various sizes (both width and diameters) on a motorcycle while preserving the capability to incorporate a disk brake, either a drive chain or belt, and use either a single side or standard swing arm in a left side or right side drive. In particular, it would be advantageous to be able to mount a TT-2 American Racing wheel on a motorcycle. The diameter could be 17 or 18 inches with a width of around 11 inches.

SUMMARY OF THE INVENTION

The present invention relates to a method for assembling a motorcycle rear hub so that the hub can mount an auto rim with a motorcycle or auto tire. The steps in the method of the present invention are generally placing an outside bearing in a wheel mount hub; inserting a bearing spacer tube into the hub and outside bearing; inserting a plurality of wheel mounting screws into the hub; attaching a brake rotor to the hub using a plurality of brake rotor mounting screws; placing a brake disk to drive pulley spacer in contact with the brake disk; inserting a plurality of inner bearings into the brake disk to drive pulley spacer; attaching the brake disk to drive pulley spacer to the hub using a plurality of spacer mounting screws so that the brake rotor is between the brake disk to drive pulley spacer and the hub; mounting a drive pulley to the brake disk to drive pulley spacer using a plurality of drive pulley mounting screws.

DESCRIPTION OF THE FIGURES

To better understand the present invention, a person of skill in the art is directed to the following figures.

Several illustrations have been presented to better aid in understanding the present invention. The scope of the present invention is not limited to what is shown in the figures.

DESCRIPTION OF THE INVENTION

The present invention relates to a method of mounting an auto rim and either motorcycle or auto tire of various sizes on a motorcycle retaining the capability to have a disk brake, a chain or belt drive and/or a single side swing or standard swing arm.

Figure 1:
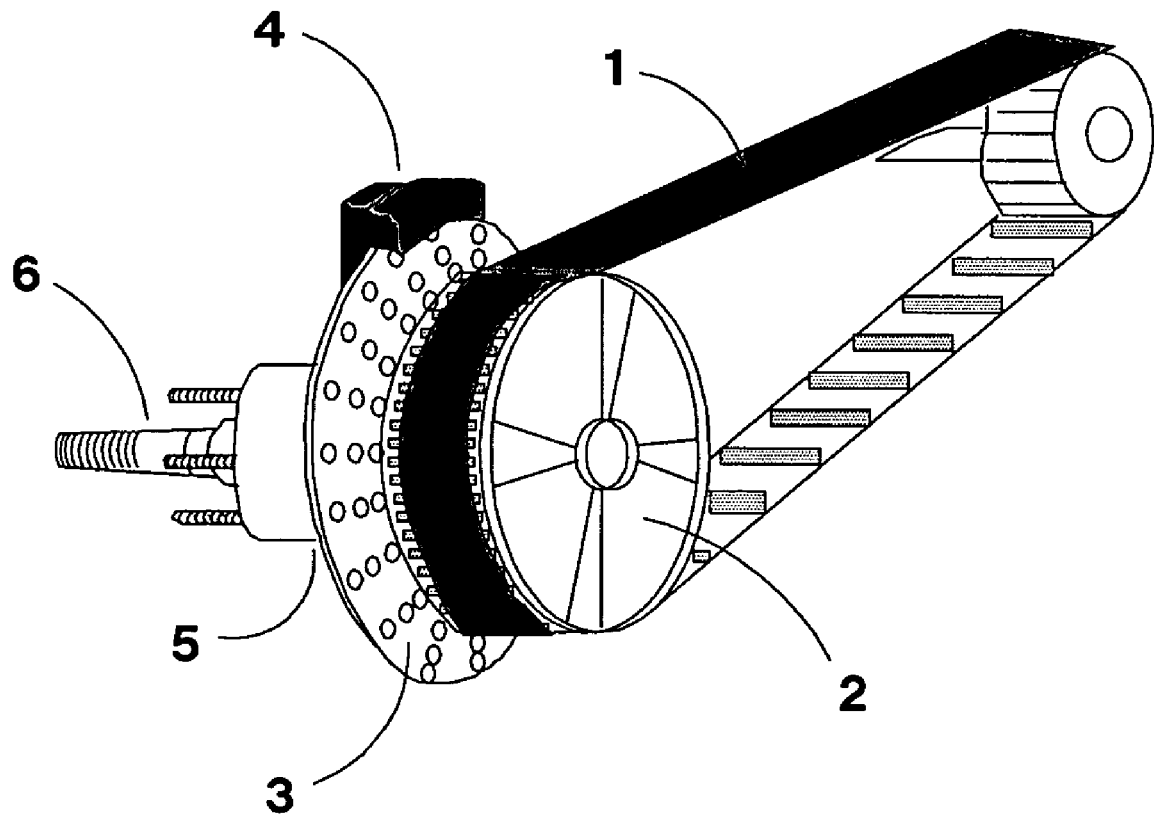
FIG. 1 shows a motorcycle belt drive with an auto rim mounting in the rear.

FIG. 1 shows a view of a motorcycle belt drive with a car rim and motorcycle tire on the rear wheel. A drive belt 1 can be seen on the right side. The drive belt 1 engages a drive pulley 2. The motorcycle in FIG. 1 can use a single side swing or standard arm (not shown). A disk brake 3 can be seen with a caliper 4. A shaft 6 passes through a bearing 5 to form a rotating wheel. The entire assembly of a hub, brake disk 3 and drive pulley 2 are mounted in tandem to form the basis for the rear wheel. The present invention relates to a method of assembling this tandem wheel so that different rims, tires, belts or chains and swing arms may be used.

Figure 2:
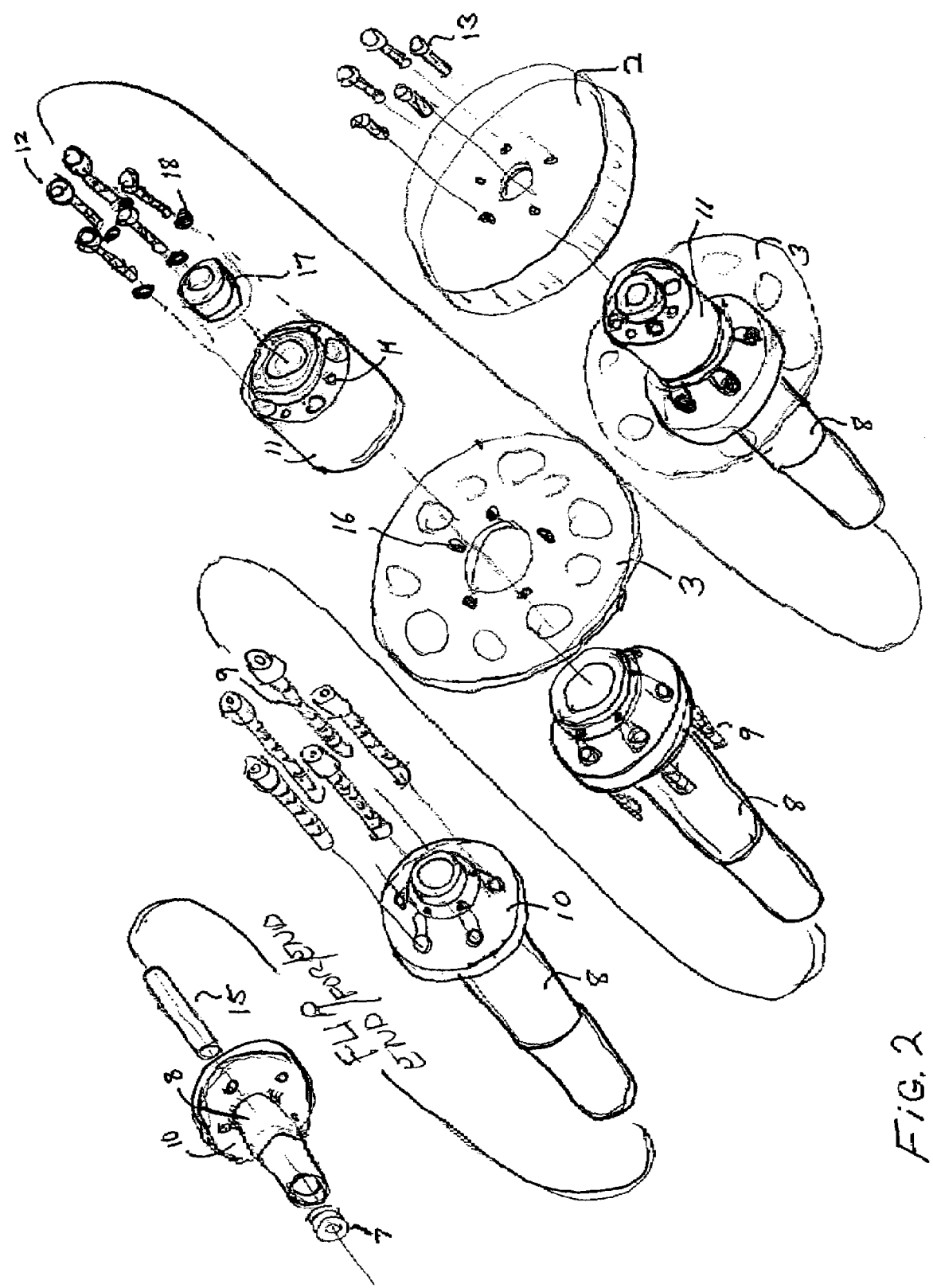
FIG. 2 shows a preferred assembly sequence to allow an auto rim and tire to be used as the rear wheel of a motorcycle.

FIG. 2 shows a particular sequence of assembly of the present invention. In this embodiment, one or two 52 mm OD×25 mm ID bearings 7 and 17 are inserted in wheel mount drive hub 8 and drive pulley spacer 11. Drive hub 8 contains a flange 10, and a bearing spacer tube 15 of 1.250×0.120 wall steel or aluminum or other metal is inserted in the hub 8. Five wheel mounting screws 9 of ½ 20×2 inch allen head (grade 9) are screwed into the hub flange 10 for mounting the wheel. A brake rotor 3 which is a brake disk that can have a generally increased center ID is inserted over the end of the hub 8 flange covering the heads of the allen screws 9. The brake rotor 3 can have several screw holes on a smaller circle than the wheel mounting allen screws 9 (a preferred number is five). A brake disk to drive pulley spacer 11 with holes 14 that match the holes in the brake rotor 3 can be mounted on the hub flange 8 holding the brake rotor 3 in place. One or two 52 mm OD×25 mm ID bearings can be inserted into the drive pulley spacer 11. Five mounting screws 12 7/16 14×1.75 inches (grade9) with ARP PN 200-8681 or similar washers 18 can be inserted through the brake disk to drive pulley spacer 11 to hold the assembly together. Finally, a drive pulley 2 can be mounted on the brake disk to drive pulley spacer 11 with pulley mounting screws 13. These can be socket head 7/16 14×1.25 inch, (grade 9) screws. The threaded holes 14 for these screws can be indexed or clocked half-way between the mounting screws 12. In this manner, and in this order, the entire assembly can be put together. It should be noted that the drive pulley 2 can could be a chain sprocket for a chain drive system. The embodiment herein described is to illustrate the present invention and aid in its understanding. Certain dimensions have been given and figures have been presented. The scope of the present invention covers numerous other embodiments with different sized parts and different hole arrangements. Bolts and screws can have US or metric threads and/or dimensions. It is preferred that the brake disk to drive pulley spacer mounting screws and the drive pulley mounting screws have socket heads and be grade 9 or better.

Figure 3:
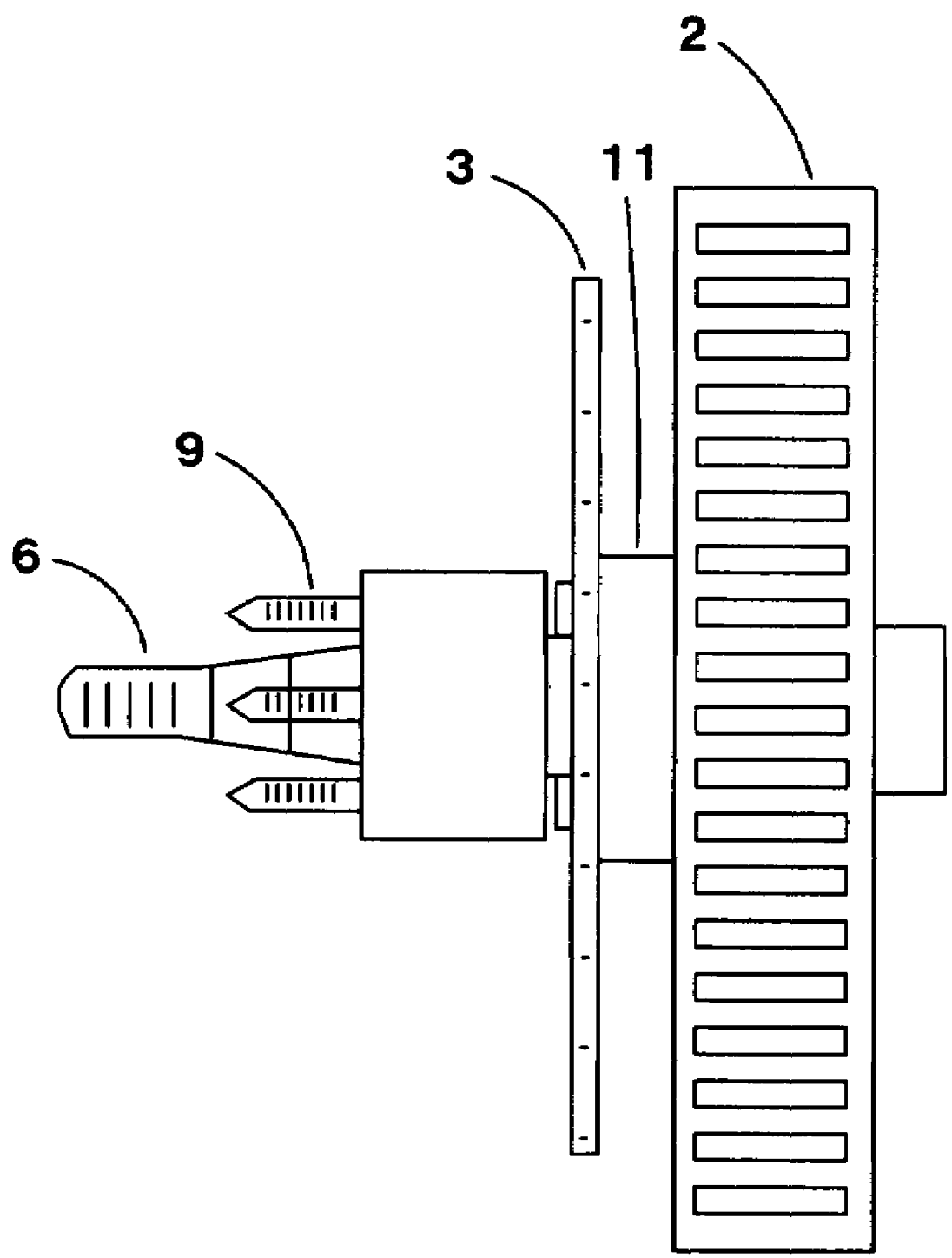
FIG. 3 shows a rear view of the embodiment of FIGS. 1-2.

FIG. 3 is a rear view of the embodiment of FIGS. 1-2. The mounting screws 9, shaft 6, brake rotor 3, drive pulley 2 and brake rotor to drive pulley spacer 11 can be clearly seen. The brake caliper if not shown in FIG. 3.

Figure 4:
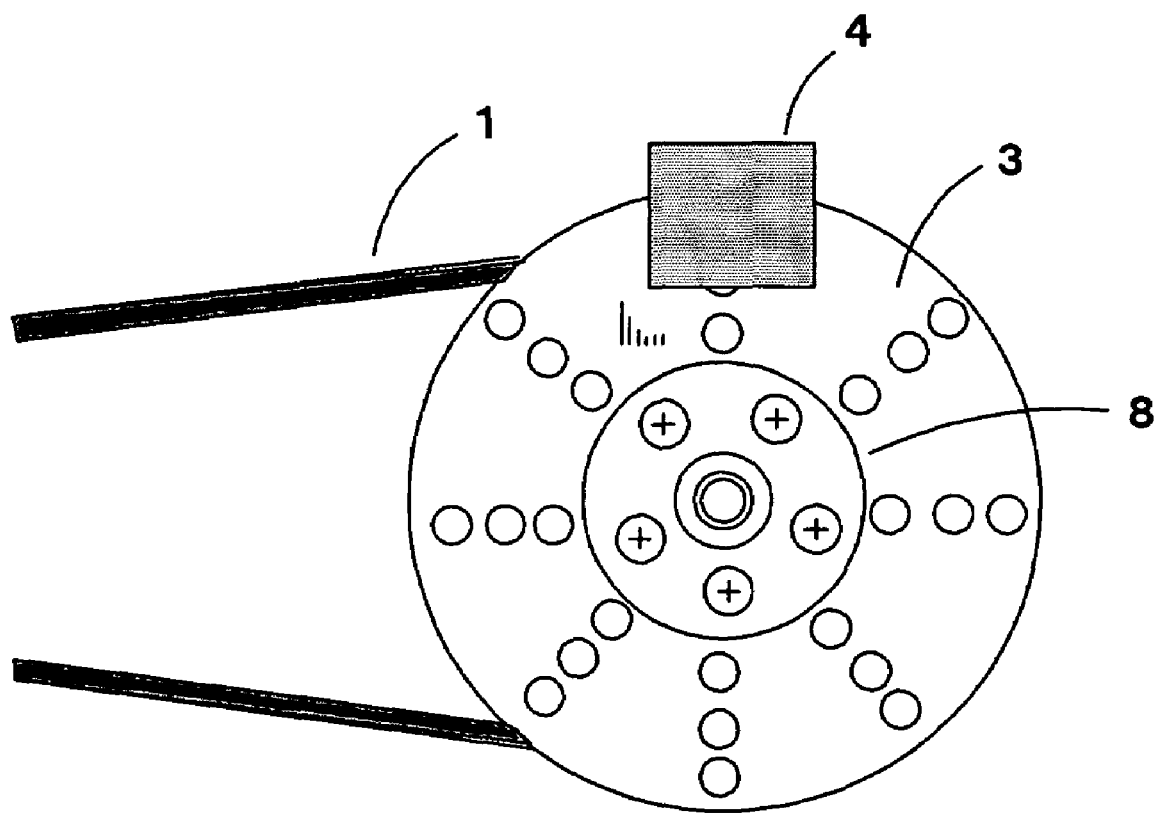
FIG. 4 shows a left-side view of the embodiment of FIGS. 1-2.
Figure 5:
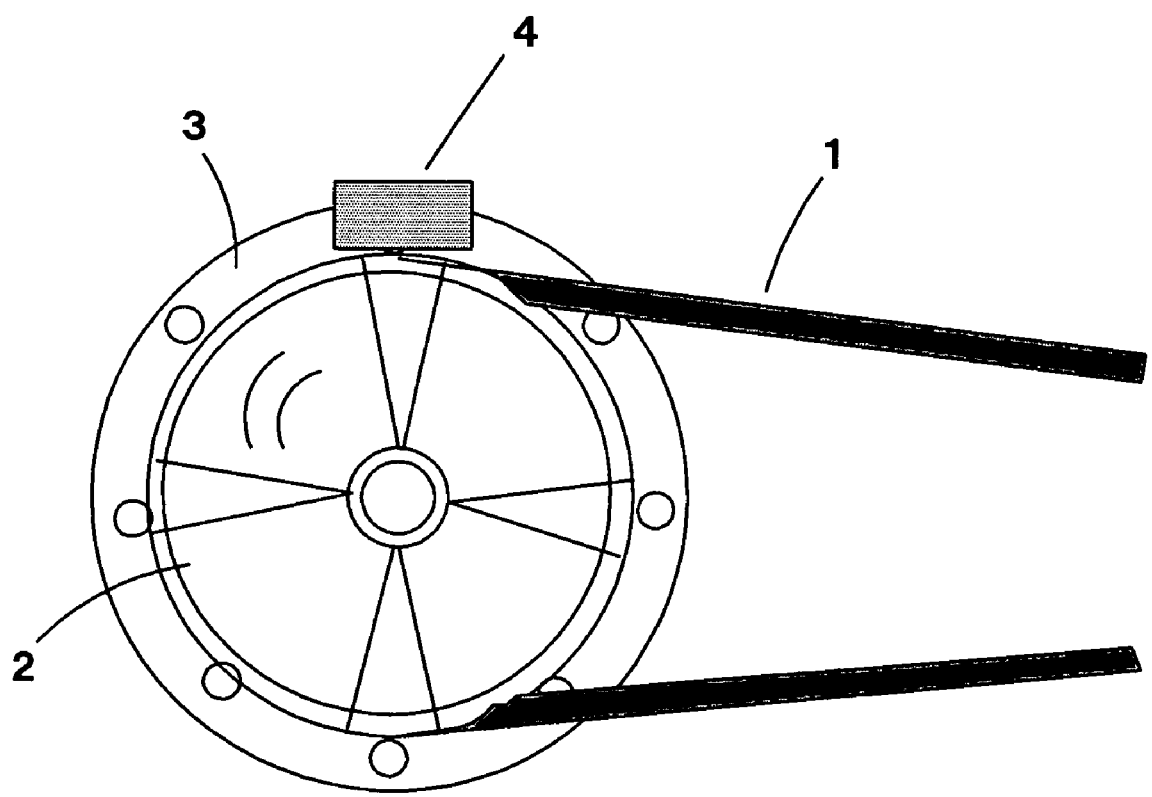
FIG. 5 shows a right-side view of the embodiment of FIGS. 1-2.

FIGS. 4-5 show the embodiment of FIG. 1 from the left and right sides with the brake caliper 4.

Several descriptions and illustrations have been presented to explain and aid in understanding the present invention. On of skill in the art will realize that numerous changes and variations are possible without departing from the spirit of the invention. Each of these changes and variations are within the scope of the present invention.

I claim:

1. A method of assembling a motorcycle rear hub so that said hub can mount an auto rim with a motorcycle or auto tire comprising the steps of:
    placing an outer bearing in a wheel mount hub;
    inserting a bearing spacer tube into said hub and outer bearing;
    inserting a plurality of wheel mounting screws into said hub;
    attaching a brake rotor to said hub using a plurality of brake rotor mounting screws;
    placing a brake-disk-to-drive-pulley-spacer in contact with said brake disk;
    inserting at least one inner bearing into said brake-disk-to-drive pulley-spacer;
    attaching said brake-disk-to-drive-pulley-spacer to said hub using a plurality of spacer mounting screws so that said brake rotor is between said brake-disk-to-drive-pulley-spacer and said hub;
    mounting a drive pulley to said brake-disk-to-drive-pulley-spacer using a plurality of drive pulley mounting screws.

2. The method of claim 1 wherein said drive pulley is a belt drive pulley.

3. The method of claim 1 wherein said drive pulley is a chain sprocket.

4. The method of claim 1 wherein said inner and outer bearings are 52 mm OD×25 mm ID.

5. The method of claim 1 wherein said bearing spacer tube is 1.250 inch×0.120 inch wall 1018 steel.

6. The method of claim 1 wherein said wheel mounting screws are ½ 0.20×2 inch screws.

7. The method of claim 1 wherein said spacer mounting screws are ⁷⁄₁₆ inch×1 ¾ inch socket head.

8. The method of claim 1 wherein said pulley mounting screws are ⁷⁄₁₆ inch×14×1.25 inch socket head.

9. The method of claim 1 wherein said spacer mounting screws and said pulley mounting screws are grade 9.

10. A method of assembling a motorcycle rear hub so that said hub can mount an auto rim with a motorcycle or auto tire comprising the steps of:
    placing an outer bearing in a wheel mount hub;
    inserting a 1018 steel bearing spacer tube into said hub and outer bearing;
    inserting a plurality of wheel mounting screws into said hub;
    attaching a brake rotor to said hub using a plurality of brake rotor mounting screws;
    placing a brake-disk-to-drive-pulley-spacer in contact with said brake disk;
    inserting a plurality of inner bearings into said brake-disk-to-drive-pulley-spacer;
    attaching said brake-disk-to-drive-pulley-spacer to said hub using a plurality of spacer mounting screws so that said brake rotor is between said brake disk-to-drive pulley spacer and said hub;
    mounting a belt drive pulley or chain sprocket to said brake-disk-to-drive pulley-spacer using a plurality of drive pulley mounting screws.

11. The method of claim 10 wherein said inner and outer bearings are 52 mm OD×25 mm ID.

12. The method of claim 10 wherein said bearing 1018 steel spacer tube is 1.250 inch×0.120 inch wall.

13. The method of claim 10 wherein said wheel mounting screws are grade 9 ½ inch×0.20×2 inch and said spacer mounting screws are grade 9 ⁷⁄₁₆ inch×1 ¾ inch socket head screws.

* * * * *